(12) United States Patent
Yoshida et al.

(10) Patent No.: US 9,511,407 B2
(45) Date of Patent: Dec. 6, 2016

(54) METHOD OF MACHINING METAL PLATE AND MESH MEMBER PRODUCED BY THE MACHINING METHOD

(71) Applicant: UCHIYAMA MANUFACTURING CORP., Okayama (JP)

(72) Inventors: Yukio Yoshida, Okayama (JP); Tomonori Kuzuhara, Okayama (JP); Yasunori Kuzuhara, Okayama (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 0 days.

(21) Appl. No.: 14/426,712

(22) PCT Filed: Aug. 30, 2013

(86) PCT No.: PCT/JP2013/073304
§ 371 (c)(1),
(2) Date: Mar. 6, 2015

(87) PCT Pub. No.: WO2014/042019
PCT Pub. Date: Mar. 20, 2014

(65) Prior Publication Data
US 2015/0239030 A1 Aug. 27, 2015

(30) Foreign Application Priority Data

Sep. 12, 2012 (JP) ................................ 2012-200735

(51) Int. Cl.
*B21D 35/00* (2006.01)
*B21D 22/26* (2006.01)
(Continued)

(52) U.S. Cl.
CPC ......... *B21D 35/001* (2013.01); *B01D 29/0093* (2013.01); *B01D 35/02* (2013.01);
(Continued)

(58) Field of Classification Search
CPC .................................................... B21D 35/001
See application file for complete search history.

(56) References Cited

U.S. PATENT DOCUMENTS 2,422,952 A * 6/1947 Dakin .................... B21D 22/02
29/34 R
4,767,964 A * 8/1988 McGlothlan .......... H01J 29/806
313/293

(Continued)

FOREIGN PATENT DOCUMENTS

CN 101909413 A 12/2010
JP 54-074263 6/1979
(Continued)

*Primary Examiner* — Krishnan S Menon
*Assistant Examiner* — Ryan B Huang
(74) *Attorney, Agent, or Firm* — Muncy, Geissler, Olds & Lowe, P.C.

(57) ABSTRACT

A method of machining a metal plate, the method processing a net body made of a metal plate into a dome shape, the net body having a plurality of lattice-shaped through holes. An extension allowance portion is formed in a plurality of side portions so as to curve along a surface area direction, the side portions are formed in a process area of the net body being pressed at a time of drawing-machining, and the extension allowance portion is formed when forming the net body having the side portions constituting the through holes by processing the metal plate. The net body is processed into the dome shape by drawing-machining from one side to an other side.

20 Claims, 3 Drawing Sheets

(51) Int. Cl.
 *B01D 39/10* (2006.01)
 *B01D 35/02* (2006.01)
 *B01D 29/00* (2006.01)
 *B21D 31/02* (2006.01)
 *B01D 29/01* (2006.01)

(52) U.S. Cl.
 CPC .............. *B01D 39/10* (2013.01); *B21D 22/26* (2013.01); *B21D 31/02* (2013.01); *B01D 29/012* (2013.01)

(56) References Cited

U.S. PATENT DOCUMENTS

| | | | | | |
|---|---|---|---|---|---|
| 5,119,658 | A | * | 6/1992 | de Smet | B21D 22/10 72/348 |
| 5,376,264 | A | * | 12/1994 | Betancourt | B01D 29/01 210/166 |
| 6,003,359 | A | * | 12/1999 | Futamura | B21D 22/208 72/342.1 |
| 6,696,169 | B1 | * | 2/2004 | Rottger | B21D 31/043 428/571 |
| 2004/0016280 | A1 | * | 1/2004 | Ishihara | B21D 22/02 72/342.1 |
| 2006/0273002 | A1 | * | 12/2006 | Maymudes | E03C 1/264 210/460 |
| 2007/0251161 | A1 | * | 11/2007 | Tuczek | E04B 7/102 52/80.1 |
| 2010/0133167 | A1 | * | 6/2010 | Collins | B01D 29/035 210/447 |
| 2010/0309629 | A1 | | 12/2010 | Li et al. | |

FOREIGN PATENT DOCUMENTS

| | | |
|---|---|---|
| JP | 62-197228 | 8/1987 |
| JP | 09-308923 | 12/1997 |
| JP | 2004-50230 | 2/2004 |

* cited by examiner

METHOD OF MACHINING METAL PLATE AND MESH MEMBER PRODUCED BY THE MACHINING METHOD

TECHNICAL FIELD

The present invention relates to a method of machining a net body of a metal plate a plurality of with through holes into a dome shape and to a mesh member produced by the method.

BACKGROUND ART

A mesh member, namely a filter, used in rectification assembled in a flow pipe, has been conventionally known. The mesh member is produced by exerting a plastic working, such as drawing-machining, on a net body to form a dome shape, the center of which projects so as not to interfere with a vane in the pipe. The shape of the mesh member before processing is shown in FIG. 3. A net body 100 having side portions 100b, 100b . . . constituting a plurality of through holes 100a in a shape of lattice is formed on a metal plate and is drawn into a dome shape, thereby obtaining the mesh member.

In this case, there arises a problem that stress caused by expansion force generated at the time of drawing-machining is applied to the thin linear side portions 100b, 100b . . . and the side portions 100b are easily broken. Such a problem may be prevented by reducing speed of pressing at the time of drawing-machining and gradually molding the mesh member by a series of press processes; however, such solutions are not efficient.

In Patent Literature 1, a porous portion is formed on a metal plate and is heated by baking by a heating apparatus such as a burner, thereafter the metal plate is pressed with a desirable press mold. Patent Literature 1 discloses that the porous portion is unlikely to be broken by the press process because the porous portion is heated by baking before being pressed.

CITATION LIST

Patent Literature

PTL 1: JP-A-2004-50230

SUMMARY OF INVENTION

Technical Problem

The method disclosed in Patent Literature 1 requires a process of heating the porous portion by baking with the heating apparatus after the porous portion is provided for the metal plate, so that further improvement has been desired in view of efficiency.

The present invention is proposed in view of the above-mentioned problems and has an object to provide a method of machining a metal plate capable of efficiently processing a metal plate and to provide a mesh member produced by the method.

Solution to Problem

A method of machining a metal plate in an embodiment of the present invention is a method of processing a net body made of a metal plate and having a plurality of lattice-shaped through holes into a dome shape. When the net body having a plurality of side portions constituting the through holes is formed by processing the metal plate, an extension allowance portion is formed in the side portions formed in a process area of the net body being pressed at a time of drawing-machining, so as to curve along a surface area direction. The net body is processed into the dome shape by drawing-machining from one side to an other side.

As mentioned above, when the expansion force caused by drawing-machining the net body into the dome shape works on each side portion, the expansion force is absorbed by deformation of the extension allowance portion and the tensile stress to the side portion is alleviated, thereby each side portion (net body) is unlikely to be broken. The extension allowance portion, curved in the surface area direction and provided for the side portion, deforms into a straight shape from a curved shape by the expansion force applied at the time of drawing-machining and the expansion force is absorbed by deformation of the extension allowance portion, thereby the side portion is unlikely to extend and becomes thin. The design strength is kept because the net body is configured to be unlikely broken at the time of drawing-machining. In addition, the method does not need a heat treatment process such as heating and baking, which has been conventionally executed for preventing breakage of the net body at the time of drawing-machining.

In the embodiment of the present invention, the through holes can be formed by punching the metal plate, and the process area can be a central area of the net body.

As mentioned above, after the through holes are formed by punching the metal plate, drawing-machining is executed for the metal plate by a series of press procedures without a heat treatment process such as heating and backing.

In the embodiment of the present invention, the extension allowance portion can be formed between straight portions formed at both ends of the side portion.

As mentioned above, the straight portions are provided on both sides of the extension allowance portion, thereby the extension allowance portions are easily deformed without breaking. When the extension allowance portion is formed without having the straight portion at the intersection of the adjacent side portions, the angle between the side portion with the extension allowance portion and the adjacent side portion becomes sharp. The expansion force is applied on the extension allowance portion in the above condition, and the deformation force from the curved shape to the straight shape becomes large and causes stress, thereby strength against breakage is unlikely to be secured. In addition, when the extension allowance portion is formed without having the straight portion at the intersection of the adjacent side portions, the extension allowance portion is unlikely to deform at the time of drawing-machining by binding force at the intersection. On the other hand, when the straight portions are provided on both sides of the extension allowance portion, the angle between the extension allowance portion and the straight portion becomes obtuse, thereby reducing the stress applied on the side portion.

In the embodiment of the present invention, the extension allowance portion can convexly curve in a direction of a most projecting top portion of the process area.

As mentioned above, the net body is less likely to be broken. The net body is in the shape of a dome by drawing-machining; therefore, the extension allowance portion is already formed convex in the expanding direction at the time of drawing-machining when the extension allowance portion is formed convex in the direction opposite to the most projecting top of the process area. In the above case, when the expansion force by drawing-machining is applied on each side portion, the expansion force is unlikely to be absorbed by deformation of the expansion allowance portion. On the other hand, in the above-mentioned embodiment in which the extension allowance portion is formed convex in the direction of the top, the expansion force by drawing-machining is applied on each side portion from the center in the outward direction, the expansion force is absorbed by deformation of the extension allowance portion, thereby the side portion is unlikely to generate tensile stress and each side portion (net body) is unlikely to be broken. In the embodiment of the present invention, the extension allowance portion of the side portion can have a longer curve line as the extension allowance portion is provided closer to the most projecting top portion.

As mentioned above, deformation degree of the side portion by drawing-machining becomes larger as the side portion is provided closer to the top of the process area, thereby each side portion is able to adapt the deformation degree of drawing-machining.

In the embodiment of the present invention, a mesh member is produced by drawing-machining a net body made of a metal plate into a dome shape by means of the method as mentioned above. As mentioned above, being efficiently processed, the mesh member is able to keep the design strength.

Advantageous Effects of Invention

In the method of machining the metal plate of the present invention, the drawing-machining process of the metal plate is efficiently executed.

In addition, being efficiently processed, the design strength of the mesh member is obtained in the present invention.

BRIEF DESCRIPTION OF DRAWINGS

FIG. 1a is a diagrammatic plan view of the net body and FIG. 1b is an enlarged view of a region "A" in FIG. 1a.

FIG. 2a is a diagrammatic plan view of the mesh member and FIG. 2b shows a diagrammatic longitudinal section taken in the directions of the arrow along the line X-X of FIG. 2a.

DESCRIPTION OF EMBODIMENTS

The embodiment of the present invention is explained referring to the attached drawings.

Some detailed reference numbers which are allotted in another figure are not shown in some figures.

Figure 1A:
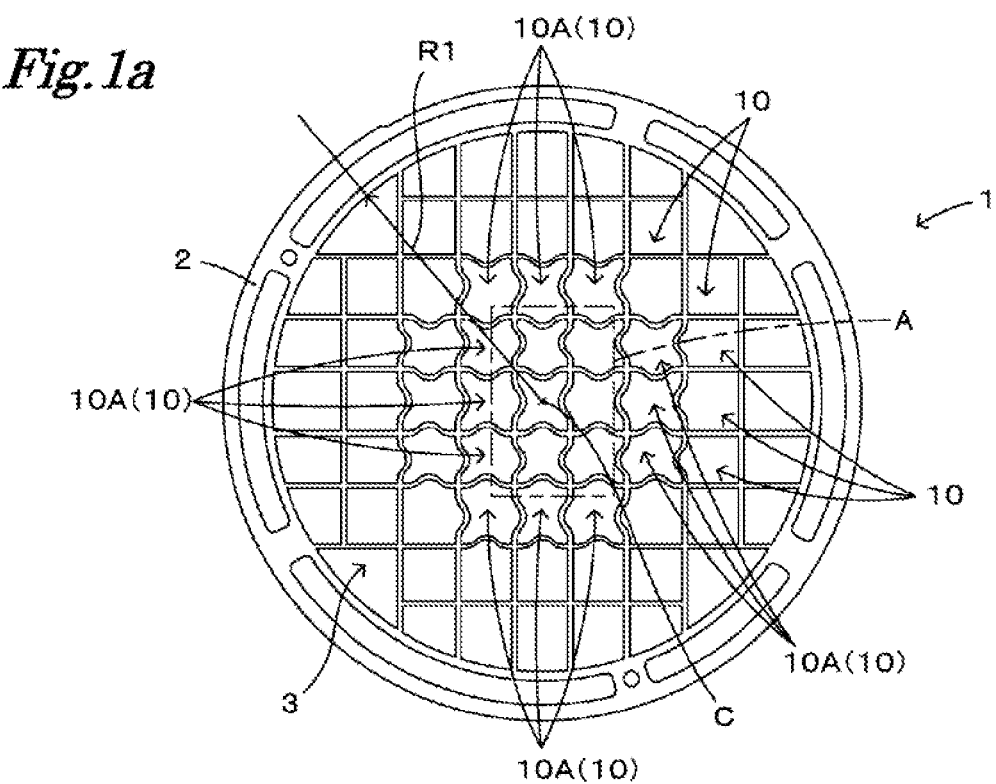
FIG. 1a and FIG. 1b diagrammatically show one example of a net body before drawing-machining in the method of machining a metal plate of the embodiment of the present invention.
Figure 1B:
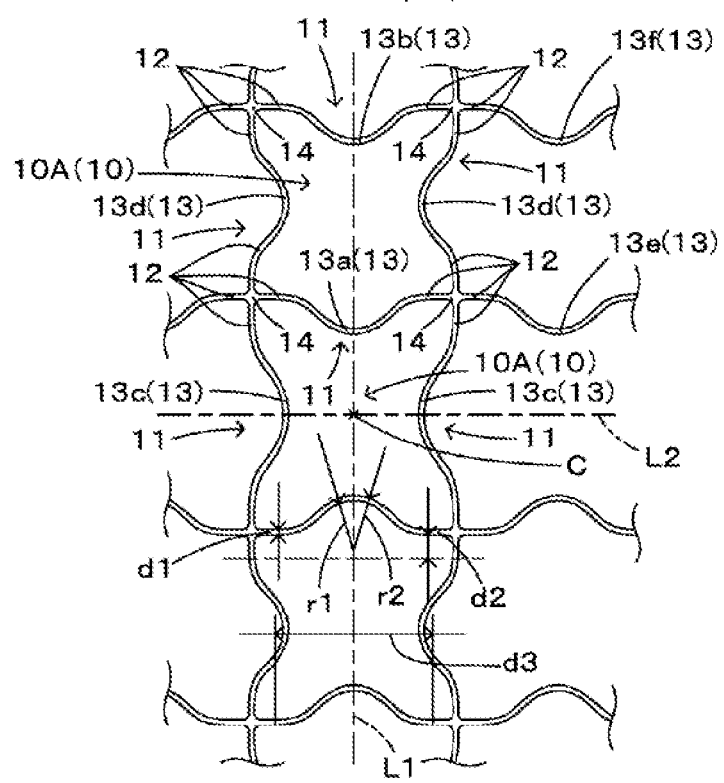
Figure 2A:
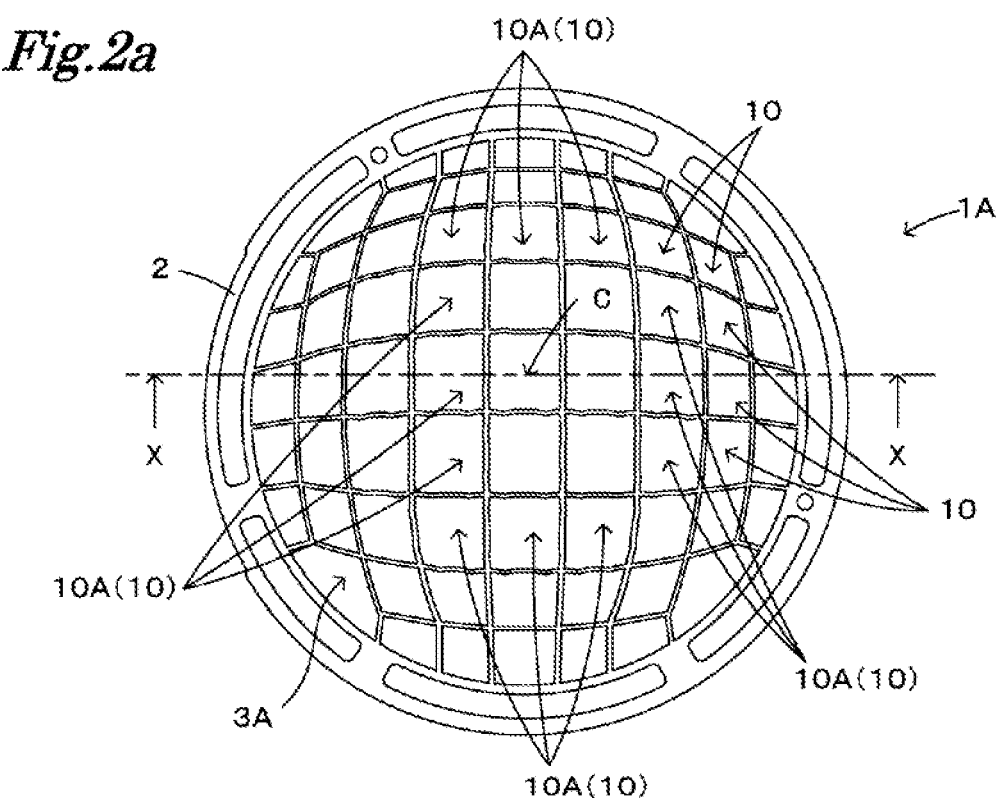
FIG. 2a and FIG. 2b diagrammatically show one example of a mesh member produced by the method of machining a metal plate of one embodiment of the present invention.
Figure 2B:
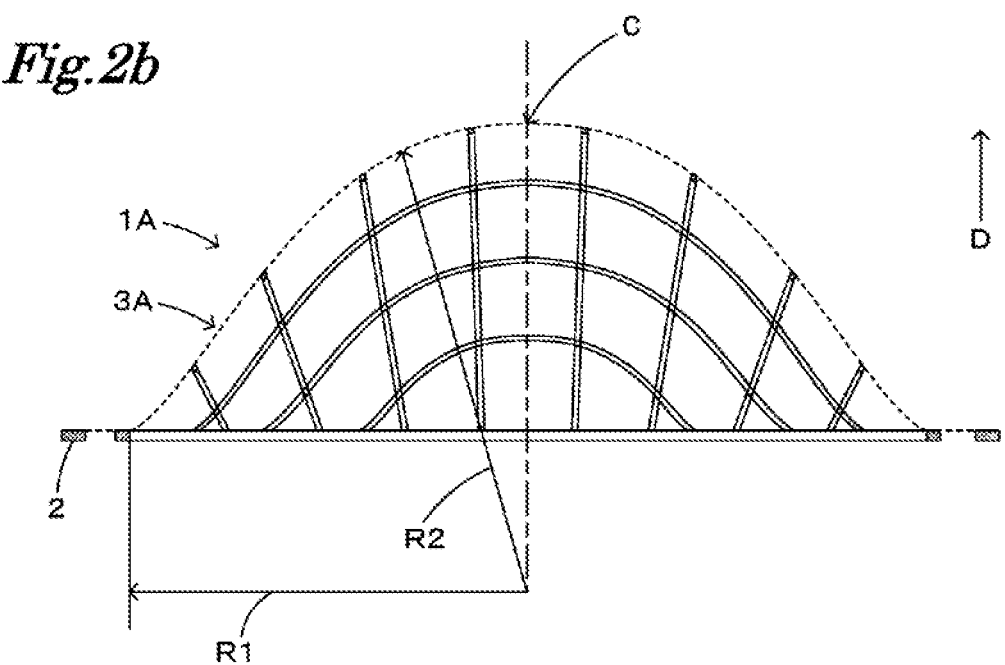
Figure 3:
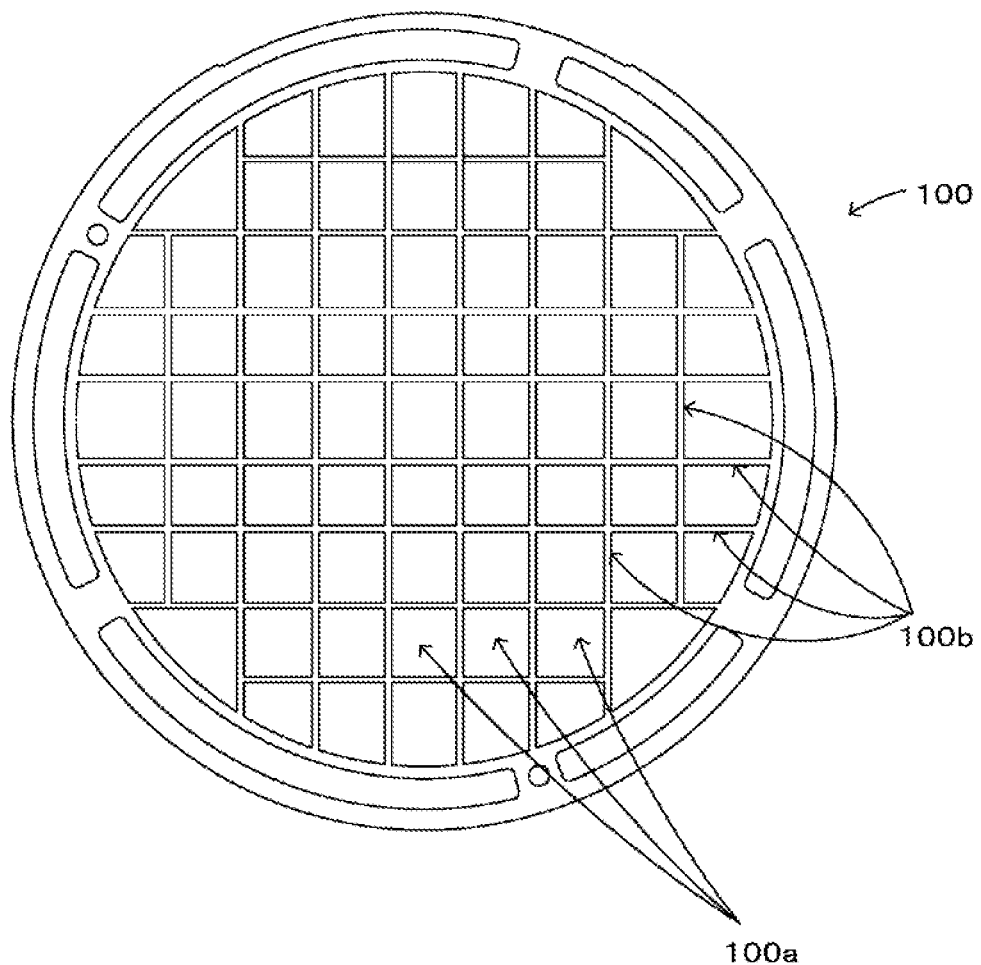
FIG. 3 is a diagrammatic plan view of an example of the net body before drawing-machining in a conventional method of machining a metal plate.

FIG. 1a and FIG. 1b diagrammatically shows one example of a net body before drawing-machining in the method of machining a metal plate of the embodiment of the present invention. FIG. 2a and FIG. 2b diagrammatically shows one example of a mesh member produced by drawing-machining the net body.

The method of machining a metal plate in the embodiment of the present invention has a first step of producing a net body 1 and a second step of producing a mesh member 1A by drawing-machining the net body 1.

(First Step)

The embodiment of the present invention shows that the net body 1 in the form of a substantially circular disk of which plan view is substantially circular is produced.

The metal plate can be austenite stainless steel, ferritic stainless steel, martensitic steel, or duplex stainless steel. The thickness of the metal plate can be in the range from 0.2 mm to 0.8 mm, preferably about 0.5 mm.

In the first step in the method of machining the metal plate of the embodiment of the present invention, a metal plate (not shown) in the form of a thin sheet, is processed and the net body 1 with a plurality of lattice-shaped through holes 10 is produced. Specifically, the net body 1 is desirably produced by a punching process in such a manner that the metal plate is placed on a board and is pressed with a punch from the upper side.

After the through holes 10 are formed by punching the metal plate, a drawing-machining process is executed in the second step. Such a drawing-machining process can be completed in a series of press procedures, thereby achieving efficiency.

The through holes 10 are not limited to be produced by the punching process and can be formed by a laser process using a laser process machine.

The net body 1 has a net body portion 3 being in the form of a substantially circular disk of which plan view is substantially circular and having a plurality of through holes 10. The net body 1 also has a flange portion 2, being in the form of substantially circular and provided at the outer periphery. The embodiment shows an example in which a plurality of through holes 10 are provided substantially all over the net body portion 3. The through holes 10 are substantially the same in size except for the through holes 10 formed at the outer periphery of the net body portion 3. In FIG. 1a, FIG. 1b, FIG. 2a and FIG. 2b, only some through holes are allotted with the reference numeral 10 for the sake of simplicity (some through holes to be mentioned later are allotted with the reference numeral 10A in the same manner).

The through holes 10 are provided in an array along one of the surface area direction of the net body portion 3 and a direction orthogonal to such a surface area direction. The through holes 10 are provided for the net body portion 3 so as to be substantially lattice-shaped on a plan view on the whole. In the figure, each through hole 10 is formed in a substantially square shape on a plan view.

Radius R1 of the net body portion 3, i.e. distance from the center (C) of the net body portion 3 to the periphery in FIG. 1a, is for example 20 mm to 40 mm, preferably about 30 mm when the processed body is used as a mesh member 1A for rectification in a suction pipe of an automobile engine.

The through hole 10 is constituted with a plurality of side portions 11 provided around the through hole 10 as shown in FIG. 1a, also referring to FIG. 1b. In the figures, four side portions 11, 11, 11, 11 are provided around the through holes 10 and constitute the through hole 10 in a substantially square shape on a plan view.

The through hole 10 includes a region, namely an intersection 14, where adjacent side portions 11, 11 are connected. Figures show the through hole 10 having four intersections 14, 14, 14, 14.

The through hole 10 shares the side portion 11 with the adjacent through hole 10. In addition, the through hole 10 shares the intersection 14 with the adjacent through hole 10.

The through hole 10A in the vicinity of a top C, namely the center of the net body 1 to be pressed in drawing-machining to be mentioned later, has a similar structure.

In case of forming the net body 1, an extension allowance portion 13 curved in the surface area direction of the net body 1 is formed at the side portion 11 constituting the through hole 10A at a process area to be pressed in drawing-machining at the center area of FIG. 1a, i.e. around the top C, also referring to FIG. 1b. The top C to be pressed in drawing-machining is drawn in the deepest way when the net body 1 is executed with drawing-machining and becomes the most projecting portion. The top C to be pressed in drawing-machining substantially accords with the center of the net body 1, namely the net body portion 3 in the figures. The area where the through hole 10A with the extension allowance portion 13 is formed is not limited to the embodiment shown in the figures. The area can be a process area to be pressed in the drawing-machining process of the net body 1. If the area to be pressed is around an edge portion of the net body 1, the side portion 11 of the through hole 10 formed in such an area is provided with the extension allowance portion 13.

In the embodiment of the present invention, a single extension allowance portion 13 is provided for the side portion 11.

The through holes 10A having the extension allowance portion 13 are provided within the radius area of substantially half of the radius R1 of the net body portion 3 from the top C, namely the center, of the net body 1 (the net body portion 3).

The extension allowance portion 13 is provided between two ends of the side portion 11 of the through hole 10A, namely between the intersections 14, 14 of one side portion 11 and the other side portions 11, 11.

The extension allowance portion 13 is formed at the central portion of the side portion 11, namely around the center of the side portion 11, between straight portions 12, 12 at both ends of the side portion 11.

The straight portions 12, 12 are provided at both sides of the extension allowance portion 13, namely at both sides along the longitudinal direction of the side portion 11. The straight portions 12, 12 are provided between the extension allowance portion 13 and the intersections 14, 14 in the vicinity of the extension allowance portion 13, respectively.

In the embodiment, the extension allowance portion 13 is provided for the side portion 11 of the through hole 10A and is formed in convex in the direction of the top C, most projecting by drawing-machining, of the process area to be processed in drawing-machining. In the figures, the extension allowance portion 13 is substantially in the shape of a mountain on a plan view.

The extension allowance portion 13 is provided for the side portion 11 in such a manner that the height of the mountain-like shape is in the direction of the top C of the process area to be pressed in drawing-machining. Base portions at both sides of the extension allowance portion 13 in the form of a mountain are continuously formed from the straight portions 12, 12 at both sides of the extension allowance portion 13, respectively. The base portions, slanting slowly from the straight portions 12, 12, curve so as to have an obtuse angle between the extension allowance portion 13 and the straight portion 12. The top of the mountain shaped extension allowance portion 13 is softly curved.

In the figures, the extension allowance portions 13a, 13b, 13e, 13f are provided in such a manner that the height of the mountain shape is substantially orthogonal to a reference line L2 which is substantially in the same direction as the array direction of the through holes 10A through the top C.

In addition, in the figures, the extension allowance portions 13c, 13d are provided in such a manner that the height of the mountain shape is substantially orthogonal to a reference line L1, which is substantially orthogonal to the reference line L2, through the top C of the process area to be pressed in drawing-machining.

In this embodiment, the extension allowance portion 13 provided for each side portion 11 has a longer curved line as the extension allowance portion 13 is provided closer to the top C of the process area.

The curved degree of the extension allowance portion 13 becomes larger as the extension allowance portion 13 becomes closer to the top C to be pressed in drawing-machining.

In the figures, the lengths of the curved lines of the extension allowance portions 13a, 13c which are positioned at a substantially equal distance from the top C of the process area to be pressed in drawing-machining are substantially the same. The lengths of the curved lines of the extension allowance portions 13b, 13d, 13e which are positioned at a substantially equal distance from the top C are substantially the same. Also in the figures, the lengths of the curved lines of the extension allowance portions 13a, 13c which are closest to the top C of the process area to be pressed in drawing-machining are largest. The lengths of the curved lines of the extension allowance portions 13b, 13d, 13e are smaller than those of the extension allowance portions 13a, 13c. The length of the curved line of the extension allowance portion 13f is smaller than those of the extension allowance portions 13b, 13d, 13e.

Width d1 of the side portion 11 in the surface area direction of the net body 1 can be in the range from 0.2 mm to 0.8 mm, preferably 0.5 mm, as shown in FIG. 1b.

The length d2 of the straight portion 12 of the side portion 11, i.e. the length between both ends of the straight portion 12, can be 0.5 mm to 1.5 mm, preferably about 1.0 mm.

Distance d3 between the facing side portions 11, 11 constituting the through hole 10 (10A) can be 3 mm to 9 mm, preferably about 6 mm.

Curvature radius r1 of the curved portion of the extension allowance portion 13 (distance from the center of curvature to the inner circumference of the extension allowance portion 13) can be 1.3 mm to 1.9 mm, preferably 1.6 mm.

Curvature radius r2 of the curved portion of the extension allowance portion 13 (distance from the center of curvature to the outer circumference of the extension allowance portion 13) can be 1.8 mm to 2.4 mm, preferably 2.1 mm.

(Second Step)

Here the second step of the method of machining a metal plate is explained.

In the second step, the net body 1 produced in the first step is executed with the drawing-machining process from one side to the other side and is formed into a dome shape, thereby producing the mesh member 1A, as shown in FIG. 2. The net body is drawn and machined from one side of the net body 1 to the other side thereof in the direction orthogonal to the surface area direction of the net body 1, namely the direction along the thickness of the net body 1. In the embodiment, a single-phase drawing-machining process is executed for the net body 1.

The mesh member 1A has a net body process portion 3A obtained by drawing-machining the net body portion 3 and the flange portion 2 in a substantially annular shape provided at the outer circumference.

In the figure, the net body portion 3 is drawn and machined in the direction of the arrow D of FIG. 2b and is processed to be the dome-like net body process portion 3A. The dotted line in FIG. 2b shows a virtual outer shape line when the mesh member 1A, i.e. the net body process portion 3A, is seen from the side. At the time of drawing-machining the net body 1 in the second step, the curved degree of each extension allowance portion 13 reduces and the extension allowance portion 13 deforms from a curved shape to a straight shape as shown in FIG. 2a, also referring to FIG. 1a and FIG. 1b showing the extension allowance portion 13 prior to drawing-machining. When the expansion force caused by drawing-machining works on each side portion 11, the extension allowance portion 13 extends, almost loses the curved portion, and deforms in such a manner that the extension allowance portion 13 and the straight portions 12, 12 at both sides thereof become substantially straight, thereby the net body 1 deforms. The expansion force caused by drawing-machining is absorbed by deformation of the extension allowance portion 13 and the tensile stress does not generate at the side portion 11, thereby each side portion 11, i.e. the net body 1, is unlikely to be broken.

With the straight portions 12, 12 provided at both sides of the extension allowance portion 13, the angle formed by the extension allowance portion 13 and the straight portions 12, 12 becomes obtuse. Thereby the stress applied on the side portion 11 is reduced and the net body 1 is easily deformed without breaking the allowance extension portion 13 at the time of drawing-machining.

The extension allowance portion 13 is formed convex in the direction of the top C of the process area to be pressed in drawing-machining, so that the expansion force is absorbed by deformation of the extension allowance portion 13 when the expansion force caused by drawing-machining works on each side portion from the top C to the outside. Therefore, the tensile stress is not generated at the side portion 11, thereby each side portion 11, i.e. the net body, is unlikely to be broken. When the mesh member 1A for rectification is used for a suction pipe of an automobile engine, radius curvature R2, referring to FIG. 2b, of the virtual outer shape line of the mesh member 1A can be 25 mm to 45 mm, preferably 35 mm.

The drawing-machining process of the net body 1 can be executed using a desirable press die having an upper press die and lower press die. The net body 1 produced in the first step is provided between the upper and the lower press dies and the press dies are pressed to produce the mesh member 1A with a desirable shape. The mesh member 1A produced by the above-mentioned drawing-machining process of the metal plate can be used as a mesh member for rectification in the suction pipe of the automobiles as mentioned above. A seal portion can be formed by providing rubber for the flange portion 2 of the mesh member 1A, thereby producing a gasket. The gasket can be interposed in the joint portion of the pipes together with the flange portion 2, thereby preventing fluid flowing in the pipe line from leaking outside. In addition, the rubber can be integrally provided on the front and back faces of the flange portion 2 via a through hole provided for the flange portion 2.

In the embodiment, the net body 1 is substantially in the shape of a circular disk of which plan view is substantially circular. The present invention is not limited to such an embodiment. The net body 1 can be a substantially rectangular flat plate.

The embodiment shows that the net body is executed with the single-phase drawing-machining process. The present invention is not limited to such an embodiment. The net body is executed with the drawing-machining process several times.

The embodiment shows that a plurality of through holes 10 are provided substantially all over the net body portion 3. The present invention is not limited to such an embodiment and a plurality of through holes 10 can be provided at a specified portion of the net body portion 3.

In addition, the embodiment shows that a plurality of through holes 10 with substantially the same shape and size are provided for the net body portion 3. The present invention is not limited to such an embodiment. The shape and size of the through hole 10 can be different.

The embodiment shows that the through hole 10 of the net body 1 is substantially square on the plan view. The present invention is not limited to such an embodiment. The through hole 10 can be substantially polygonal on the plan view, for example substantially hexagonal on the plan view.

The embodiment shows that the extension allowance portion 13 curved in the surface area direction of the net body 1 is provided for the side portion 11 constituting the through hole 10A in the vicinity of the top C of the process area to be pressed in drawing-machining the net body 1. The present invention is not limited to such an embodiment. The through hole 10A having the extension allowance portion 13 at the side portion 11 can be formed substantially all over the net body 1.

The embodiment shows that one extension allowance portion 13 is provided for the side portion 11. The present invention is not limited to such an embodiment. A plurality of extension allowance portions 13 can be provided for the side portion 11. The embodiment shows that the extension allowance portion 13 is provided at the central portion of the side portion 11 between the straight portions 12, 12 at both ends of the side portion 11. The present invention is not limited to such an embodiment. The straight portion 12 can be provided for only one end of the side portion 11. Or the extension allowance portion 13 can be provided so as to directly extend from the intersections 14, 14 without providing the straight portions 12, 12 at both ends of the side portion 11.

The embodiment shows that the extension allowance portion 13 is substantially in the shape of a mountain on the plan view. The present invention is not limited to such an embodiment. The extension allowance portion 13 can be substantially in the shape of the letter "V" on the plan view or substantially in the shape of waves on the plan view.

The embodiment shows that the extension allowance portion 13 is formed convex in the direction of the most projecting top C of the process area to be pressed in drawing-machining. The top C is not limited to be provided at the center of the circular net body 1 as shown in the figure and the top C can be provided at an off-center position, i.e. an eccentric position. In such a case, the extension allowance portion 13 can be convexly curved toward the most projecting top C of the process area or the extension allowance portion 13 arranged closer to the top C can have a longer curve line. Direction of the extension allowance portion 13 is not limited to that in such an embodiment. Each extension allowance portion 13 can be directed differently.

The embodiment shows the curved line of the extension allowance portion 13 is longer as the extension allowance portion 13 becomes closer to the top C of the process area to be pressed in drawing-machining. The present invention is not limited to such an embodiment. The curved lengths of the extension allowance portions 13 can be substantially the same or can be different.

REFERENCE SIGNS LIST 1 net body
10 through hole
10A through hole
11 side portion
12 straight portion
13, 13a, 13b, 13c, 13d, 13e, 13f extension allowance portion
C top

The invention claimed is:

1. A method of machining a metal plate, the method processing a net body made of the metal plate into a dome shape, the net body having a plurality of lattice-shaped through holes, an extension allowance portion being formed in each of a plurality of side portions so as to curve along a surface area direction, the plurality of side portions being formed in a process area of the net body being pressed at a time of drawing-machining, all of the extension allowance portions being formed when forming the net body having the side portions constituting the through holes by processing the metal plate, and the net body being processed into the dome shape by drawing-machining from one side to an other side, all of the extension allowance portions being convexly curved in a direction of a most projecting top portion of the process area.

2. The method of machining the metal plate as set forth in claim 1, wherein the through holes are formed by punching the metal plate, and the process area is a central area of the net body.

3. The method of machining the metal plate as set forth in claim 1, wherein the extension allowance portion is formed between straight portions formed at both ends of the plurality of side portions.

4. The method of machining the metal plate as set forth in claim 1, wherein the extension allowance portion of the side which is closer to the most projecting top portion is longer than the extension allowance portion of the side portion which is further from the most projecting top portion.

5. A method of machining a metal plate, the method processing a net body made of the metal plate into a dome shape, the net body having a plurality of lattice-shaped through holes, an extension allowance portion being formed in each of a plurality of side portions so as to curve along a surface area direction, the plurality of side portions being formed in a process area of the net body being pressed at a time of drawing-machining, all of the extension allowance portions being formed when forming the net body having the side portions constituting the through holes by processing the metal plate, and the net body being processed into the dome shape by drawing-machining from one side to an other side,
the curved lines of the extension allowance portions positioned at substantially equal distances from a most projecting top portion of the process area having substantially the same lengths.

6. The method of machining the metal plate as set forth in claim 1, wherein the curved lines of the extension allowance portions positioned at a substantially equal distances from a most projecting top portion of the process area having substantially the same lengths.

7. The method of machining the metal plate as set forth in claim 5, wherein all of the extension allowance portions are convexly curved in a direction of a most projecting top portion of the process area.

8. The method of machining the metal plate as set forth in claim 5, wherein the through holes are formed by punching the metal plate, and the process area is a central area of the net body.

9. The method of machining the metal plate as set forth in claim 6, wherein the through holes are formed by punching the metal plate, and the process area is a central area of the net body.

10. The method of machining the metal plate as set forth in claim 7, wherein the through holes are formed by punching the metal plate, and the process area is a central area of the net body.

11. The method of machining the metal plate as set forth in claim 5, wherein the extension allowance portion is formed between straight portions formed at both ends of the plurality of side portions.

12. The method of machining the metal plate as set forth in claim 6, wherein the extension allowance portion is formed between straight portions formed at both ends of the plurality of side portions.

13. The method of machining the metal plate as set forth in claim 7, wherein the extension allowance portion is formed between straight portions formed at both ends of the plurality of side portions.

14. The method of machining the metal plate as set forth in claim 5, wherein the extension allowance portion of the side portion which is closer to the most projecting top portion is longer than the extension allowance portion of the side portion which is further from the most projecting top portion.

15. The method of machining the metal plate as set forth in claim 6, wherein the extension allowance portion of the side which is closer to the most projecting top portion is longer than the extension allowance portion of the side portion which is further from the most projecting top portion.

16. The method of machining the metal plate as set forth in claim 7, wherein the extension allowance portion of the side which is closer to the most projecting top portion is longer than the extension allowance portion of the side portion which is further from the most projecting top portion.

17. The method of machining the metal plate as set forth in claim 2, wherein the extension allowance portion is formed between straight portions formed at both ends of the plurality of side portions.

18. The method of machining the metal plate as set forth in claim 8, wherein the extension allowance portion is formed between straight portions formed at both ends of the plurality of side portions.

19. The method of machining the metal plate as set forth in claim 17, wherein the extension allowance portion of the side which is closer to the most projecting top portion is longer than the extension allowance portion of the side portion which is further from the most projecting top portion.

20. The method of machining the metal plate as set forth in claim 18, wherein the extension allowance portion of the side which is closer to the most projecting top portion is longer than the extension allowance portion of the side portion which is further from the most projecting top portion.

* * * * *